United States Patent [19]

Gilmore

[11] Patent Number: 5,050,291
[45] Date of Patent: Sep. 24, 1991

[54] UNIVERSAL TOOL

[76] Inventor: Guy T. Gilmore, 1823 Wildcat La., Crosby, Tex. 77532

[21] Appl. No.: 612,501

[22] Filed: Nov. 14, 1990

Related U.S. Application Data

[63] Continuation of Ser. No. 350,927, May 12, 1990, abandoned.

[51] Int. Cl.[5] .................... B23B 3/26; B23B 5/04; B23B 5/16
[52] U.S. Cl. ..................... 29/560; 51/241.5; 82/113; 82/128; 82/131; 82/123; 409/179; 409/296
[58] Field of Search ............ 29/30, 560; 82/113, 82/128, 131, 123; 408/80; 409/175, 178, 179, 296, 305; 51/241 B, 241 S

[56] References Cited

U.S. PATENT DOCUMENTS

| 3,772,944 | 11/1973 | Becker et al. ............ 82/113 |
| 3,908,491 | 9/1975 | Gilmore ................. 82/113 |
| 3,916,519 | 11/1975 | Gilmore ............... 82/113 X |
| 4,033,208 | 7/1977 | Gilmore ................. 82/113 |
| 4,177,610 | 12/1979 | Farkas et al. ......... 409/179 X |
| 4,361,061 | 11/1982 | Pullen ................... 82/128 |
| 4,656,898 | 4/1987 | Hunt et al. ........... 82/113 X |
| 4,802,278 | 2/1989 | Vanderpol et al. ..... 82/72 X |

Primary Examiner—Steven C. Bishop
Attorney, Agent, or Firm—James A. Bargfrede

[57] ABSTRACT

A machine tool is provided having a wide range of applications and uses in metal or other material fabrication. Such machine tool may be utilized on reactor flanges, pipes, and other equipment. The machine tool is pneumatically actuated and may include a vertical spindle on which may be attached a grinder, brush, or other apparatus for polishing, grinding, or contouring a workpiece. A pneumatically driven mechanism for the machine tool includes a plurality of worm gears positioned and arranged for selective rotational speed and tongue of the spindle of such tool. Essentially, the machine tool or universal tool combines functions achieved with a plurality of known tools in a single unitary tool assembly having reliability, simplicity, economy, and durability.

4 Claims, 6 Drawing Sheets

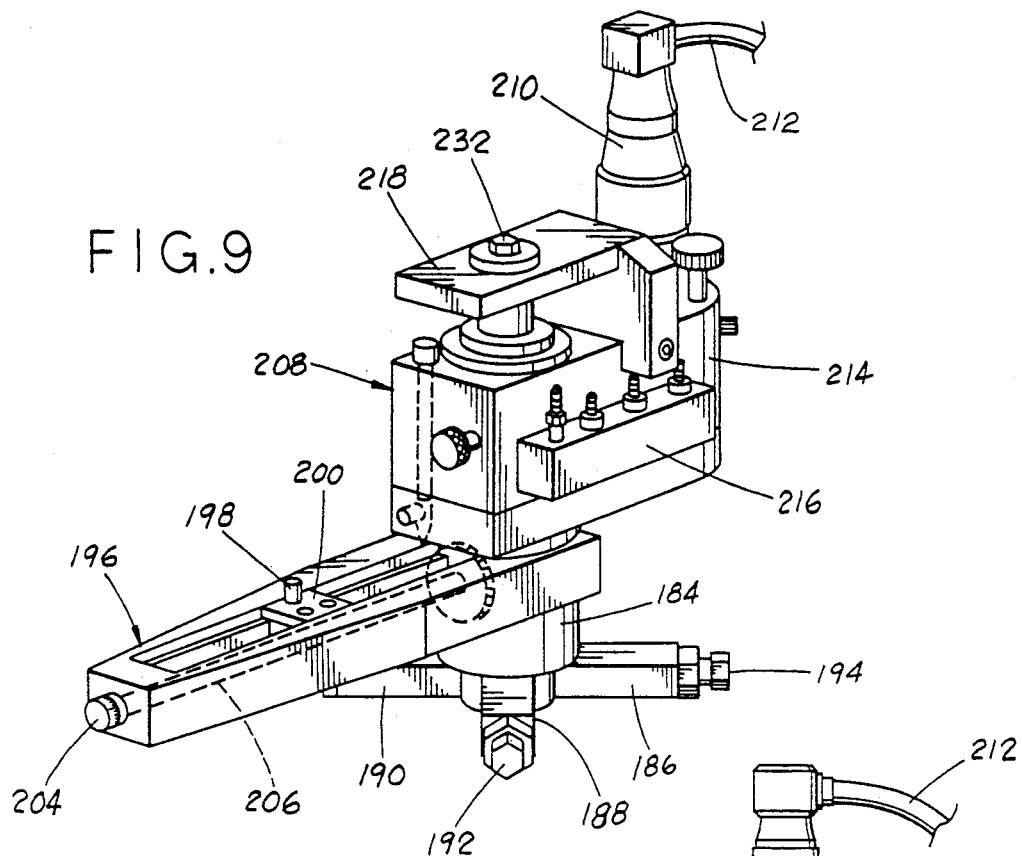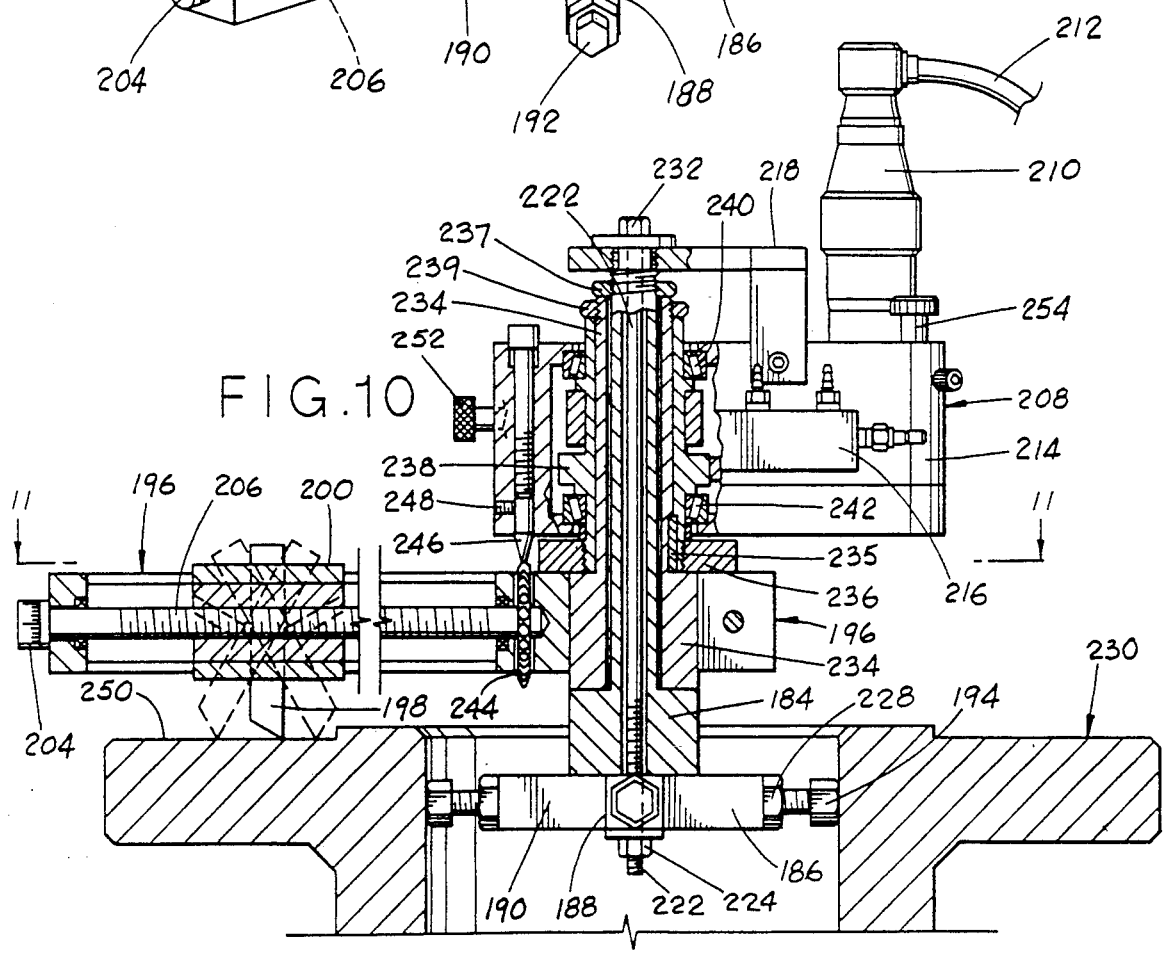

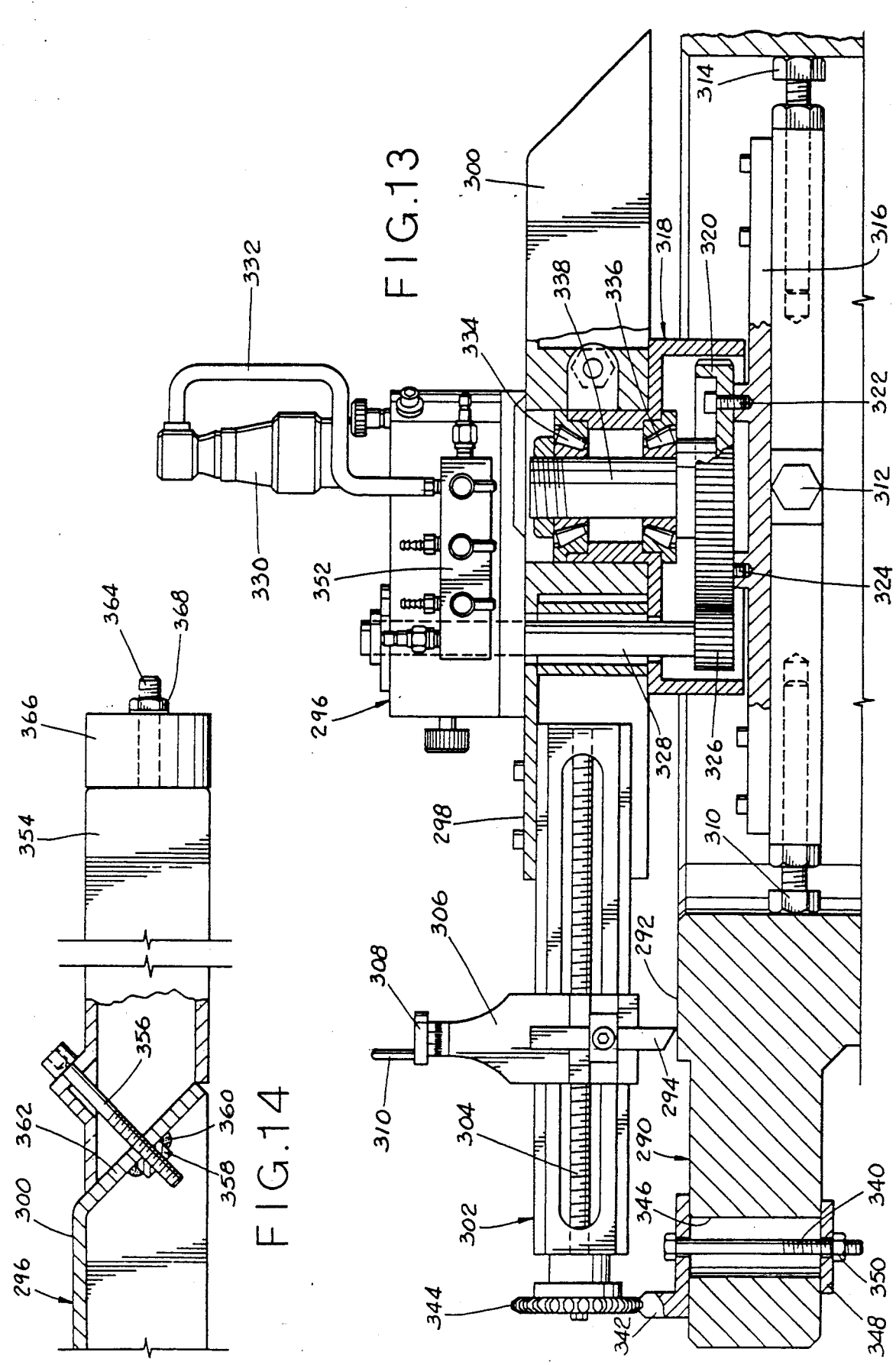

5,050,291

UNIVERSAL TOOL

This is a continuation of application Ser. No. 07/350,927 filed May 12, 1990, now abandoned.

SUMMARY OF THE INVENTION

Apparatus is provided for machining or fabricating metal or other material in a plurality of uses and environments. A lathe bed having a side support is utilized and accommodates an adjustable station on which a known cutting tool may be positioned. The side support also includes a work station having pneumatically actuated drive means for accurately positioning on a work piece such as for example a reactor flange. Such drive means includes a plurality of gear-trains coupled so that variable speed and power may be obtained to achieve optimum cutting or fabrication according to the requirements for a particular job on which the apparatus of the present invention is utilized. Various functions such as drilling, milling, and grinding of metal or other material may be achieved by modifying the apparatus components in a fast, simple, safe, and economical manner.

BRIEF DESCRIPTION OF THE DRAWINGS

FIG. 9 is an upper, perspective view of another embodiment of the device of the present invention;

FIG. 10 is a partial sectional, elevational side view of the device shown in FIG. 9;

FIG. 13 is a partial sectional, elevational side view of another embodiment of the device of the present invention shown positioned on a work piece;

FIG. 14 is a partial sectional, elevational side view of the counterweight component shown in FIG. 13;

FIG. 1 is an upper, perpective view of the device of the present invention showing bed 10 having positioned thereon a cutting tool station 12 and positioning means 14.

Figure 1:
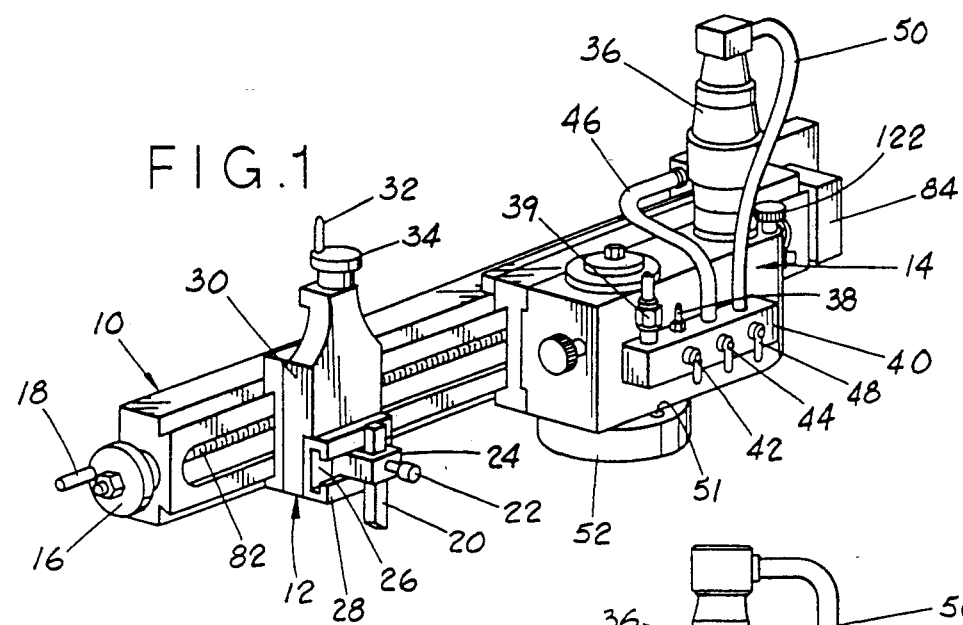
FIG. 1 is an upper, perspective view of the device of the present invention.

The device of the present invention shown in FIG. 1 essentially is a portable tool system which may be easily and conveniently carried to a worksite such as a refinery to work on materials such as reactor flanges while such reactor flanges still are connected to pipes in an operational manner. The components of the device of the present invention may be easily and quickly assembled and disassembled for convenient movement to a worksite without the necessity of time-consuming and expensive removal of, for example, reactor flanges to a shop location remote from where the flanges actually are utilized.

Bed 10 has positioned at one end a known manual feed member 16 having handle 18 positioned thereon so that handle 18 and feed member 16 may be rotated to position components which are on bed 10 in a manner to be explained in detail subsequently.

Cutting tool station 12 includes a known cutting tool 20 vertically positioned and held in place by threaded member 22 which is positioned on block 24 adapted for horizonal movement in recess 26 of member 28. Member 28 is part of support 30 which has thereon handle 32 connected to member 34. Rotation of handle 32 and member 34 allows cutting tool 20 to be positioned in a close tolerance manner to provide cutting or other metal working so that close tolerance normally associated with shop work may be achieved on location field when utilizing the total assembly of the present invention.

Positioning means 14 includes an air motor 36 which actuates the drive means which will be explained in detail subsequently. Inlet 39 is connected swivelly to an air compressor (not shown). Manifold 40 includes a cut off value 42 for the spare outlet 38 from the air compressor. Value 44 controls air flow through line 46 and value 48 controls air flow through line 50 to air motor 36.

Base plate 52 having a plurality of adjustment screws such as screw 51 is positioned on the workpiece in a manner to be explained subsequently to allow machining to occur in accordance with the teaching of the present invention. Essentially, as pointed out previously, the present invention allows machining of all types to be performed outside of a machine shop at the location of the workpiece so that instead of moving the workpiece to the machine shop, a portable machine shop has been provided which allows many kinds of metal working to be achieved.

Figure 2:
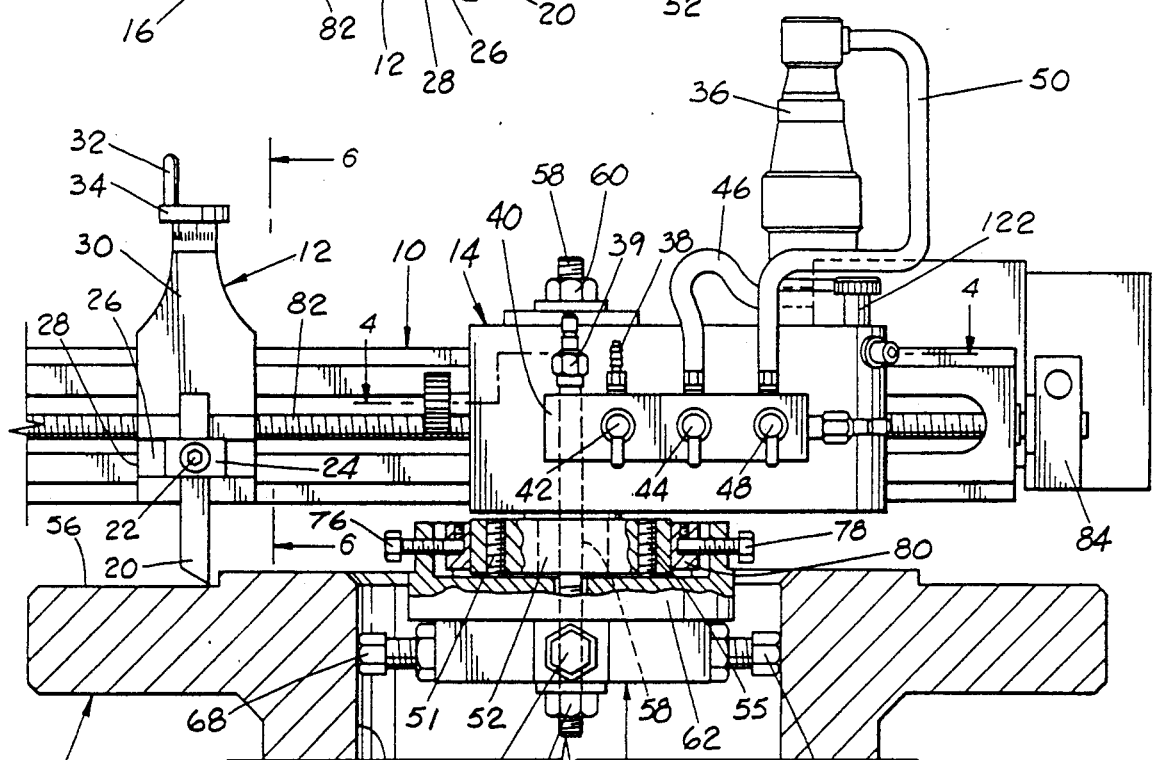
FIG. 2 is a partial sectional, elevational side view of the device of the present invention positioned on a reactor flange.

FIG. 2 is a partial sectional, elevational side view of the device of the present invention positioned on a reactor flange 54. As pointed out in connection with FIG. 1, reactor flange 54 is stationary and cutting tool 20 rotates around flange 54 thereby providing a finish to face 56. It will be appreciated that the reference numerals identifying various components in FIG. 1 with respect to the cutting tool 20 are similarly marked in FIG. 2 and do not require further explanation.

Base plate 52 has a threaded bolt 58 extending upwardly and is threadedly connected with nut 60 to the upper portion of the positioning means 14. The lower portion of bolt 58 extends downwardly through assembly 62 and is connected with nut 64 to member 66 which has positioning bolts such as bolts 68, 70 and 72 for ridgedly positioning on the inside surface 74 of flange 54.

After member 66 is positioned on the surface 74 of the flange 54, the upper portion of assembly 62 is frictionally engaged to the base plate 52 by tightening screws 76 and 78 thereby causing engagement of pad 80 which surrounds base plate 52 to engage the same and thereby allow rotational movement of the total assembly of the present invention around flange 54 as explained previously. A plurality of adjustment screws such as screws 51 and 55 are used for accurate alignment and positioning of the tool assembly on the flange 54.

Rotation of the cutting tool around the workpiece is accomplished through the novel drive means of the present invention. It will be apparent to those skilled in the machine tool art, that lead screw 82 positioned on bed 10 allows cutting tool 20 to move in a horizonal plane in a manner well known in such art. Lead screw 82 extends along the longitudinal recess of bed 10 to journal housing 84. It will be appreciated in viewing FIG. 2 that the valves 42, 44, and 48 on manifold 40 allow selective passage of air from inlet 39 which is swively connected to an air compressor (not shown) so that compressed air may be delivered simultaneously or selectively through outlet 38, line 46, and line 50. Line 50, as pointed out previously, is connected to drive the air motor 36 which actuates the drive means in a manner to be explained in greater detail subsequently. Rotational speed and power is controlled through the drive means thereby allowing and assuring positive, reliable, safe, and economical operation of the device of the present invention.

Figure 3:
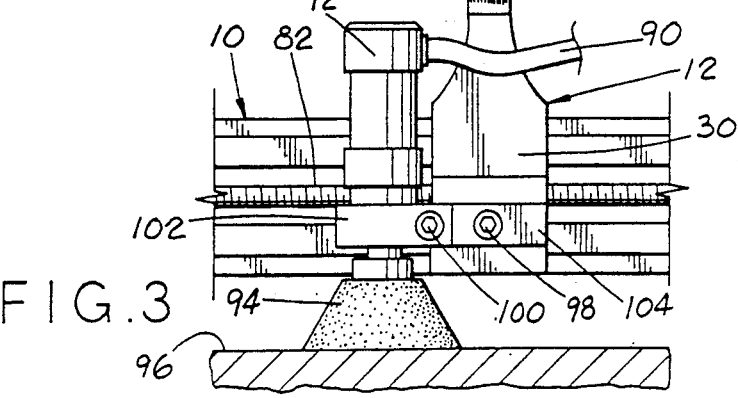
FIG. 3 is an elevational side view showing a grinder utilized with the device of the present invention.

FIG. 3 is an elevational side view showing a grinder utilized with the present invention with air line 90 connected to air motor 92 to provide rotational drive to the grinder 94. It will be appreciated that line 90 is coupled to outlet 38 on manifold 40 for an air supply for air motor 92. Surface 96 is worked on by the grinder 94 for removal of material and to finish or polish surface 96 depending upon the requirements of the particular job to be performed. As explained previously, bed 10 has positioned thereon cutting tool station 12 which includes support 30 having handle 32 positioned on member 34 to allow close tolerance positioning and movement of the grinder 94. Bolts 98 and 100 are used for fastening the grinder 94, connected to air motor 92, to members 102 and 104. The operation of the grinder shown in FIG. 3 allows rotational, vertical, and horizonal movement of the grinder 94 with respect to the surface 96. Also, it will be appreciated as explained in connection with FIG. 2 that the entire assembly of the present invention may rotate about a vertical axis thereby allowing great adaptability and a wide variety of uses of the present invention.

Figure 4:
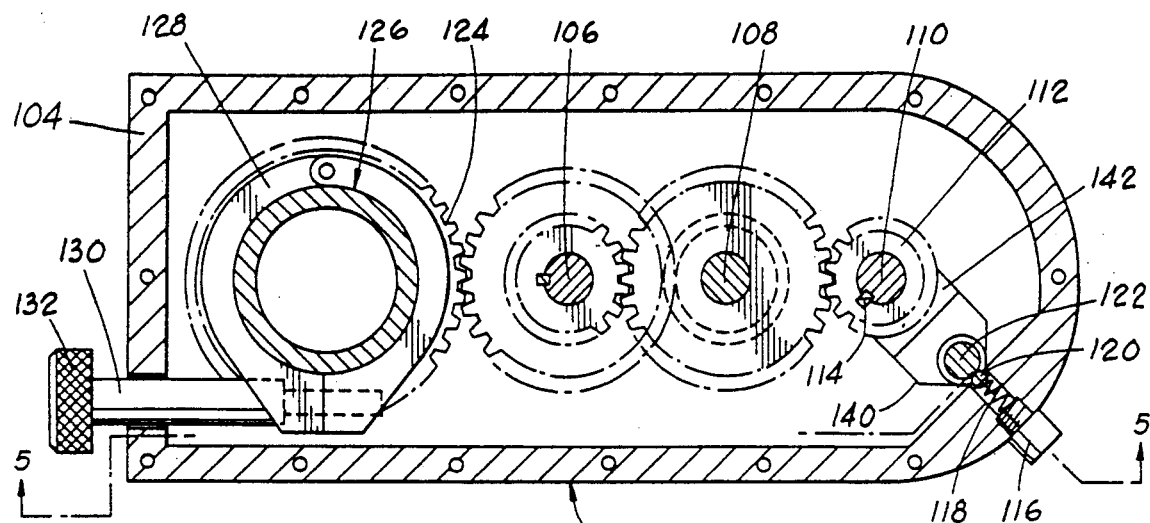
FIG. 4 is a partial sectional, top plan view of the drive means of the present invention taken along line 4—4 of FIG. 2.

FIG. 4 is a partial sectional, top plan view of the drive means of the present invention taken along line 4—4 of FIG. 2 and comprises a plurality of gears adapted for selective torque and speed transmission.

The drive means 14 includes housing 104 having positioned therein axle 106 having a plurality of gears positioned thereon and axle 108 having a plurality of gears positioned thereon and adapted for engagement with the gears of axle 106. The gears on axle 108 are driven by air motor 36 which has a shaft 110 and a gear 112 connected thereto along key 114. Pin 116 having a spring 118 and a ball set 120 allow axial movement of member 122 to provide selective engagement of gear 112 with the gears on axle 108.

As will be explained in connection with FIG. 5 in more detail, the gear on axle 106 drives gear 124 which is positioned on member 126. Member 126 has rotational movement and a tension lock or brake assembly including brake shoe 128 may be manually controlled with bolt 130 having a knurled knob 132 attached thereto. Thus, as rotation of the drive means 14 occurs, the tension lock or brake assembly can either slow down or stop such rotation depending upon the particular requirements of the job and, therefore, allows great adaptability of the system incorporating the present invention.

Figure 5:
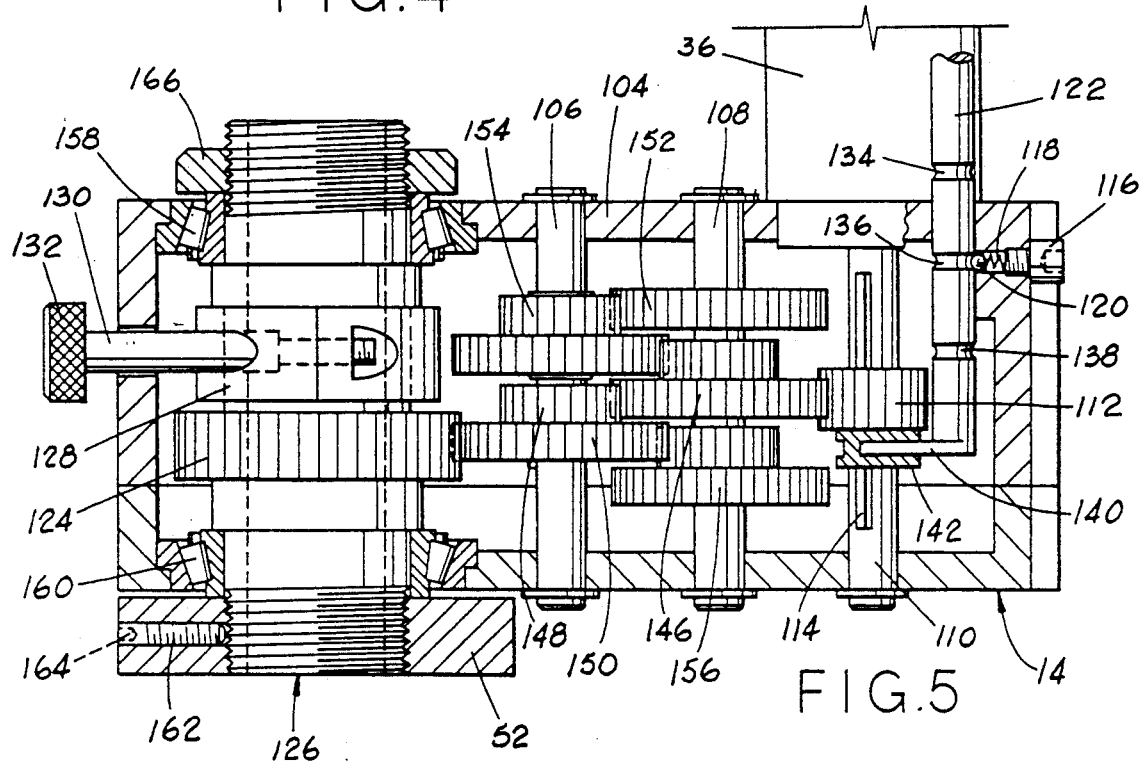
FIG. 5 is a partial sectional, elevational side view of the drive means taken along line 5—5 of FIG. 4.

FIG. 5 is a partial sectional, elevational side view of the drive means taken along line 5—5 of FIG. 4 showing recess 134, 136, and 138 in member 122 which has a protrusion 140 at the lower portion to allow engagement with member 142 on axle 110 on which is positioned gear 112.

As pin 116 is pulled, ball 120 which is normally pushed again member 122 by spring 118 allows vertical movement of member 122, and in turn, gear 112 moves on axle 110 having key 114.

In the position shown in FIG. 5, gear 112 engages gear 146 on axle 108 and gear 146 engages gear 148 on axle 106. Gear 150 on axle 106 engages gear 124 as explained previously.

Thus, in the gear mechanism and power train shown in FIG. 5, gear 146 and gear 152 on axle 108 are in engagement with small diameter gears 148 and 154 on axle 106 to provide drive to gear 124 as explained previously.

When member 122 is moved upwardly so that ball 120 is in engagement with recess 138, it will be appreciated that gear 112 moves upwardly to engage gear 152 on axle 108. When member 122 is moved downwardly so that ball 120 is in recess 134, gear 112 will be in engagement with gear 156. The three speed transmission requires only about two inches of vertical space.

Thrust bearing 158 and thrust bearing 160 are positioned on member 126. As explained previously, a brake assembly including brake shoe 128 which may be tightened or loosened by bolt 130 having knurled knob 132 attached thereto is provided to slow or stop rotation of the drive means 14. Machine tool head 52 is threadedly coupled to member 126 and may be locked with lock screw 162 through rotation at recess 164 with suitable means such as a wrench. Upper thrust bearing 158 provides stablility to the upper portion of member 126 which is threadedly engaged with member 166.

Figure 6:
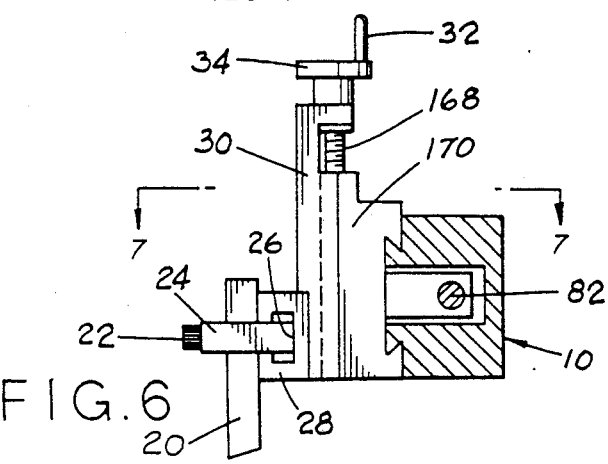
FIG. 6 is a partial sectional, elevational end view of the tool holder of the device of the present invention.

FIG. 6 is a partial sectional, elevational end view of the tool holder of the device of the present invention showing tool 20 being held by threaded member 22 on tool holder 24. Member 28 has channel 26 positioned therein to allow positioning movement of tool 20 in channel 26 has explained in connection with FIG. 1. Vertical movement of the tool 20 is accomplished by rotation of member 34 having handle 32 attached thereto and such vertical movement is accomplished in a manner well known in the machine tool art. Member 30 moves axially along bed 10 as explained in connection with FIG. 1 and bed 10 has lead screw 82 positioned therein to allow axial positioning of the tool 20 along bed 10.

Figure 7:
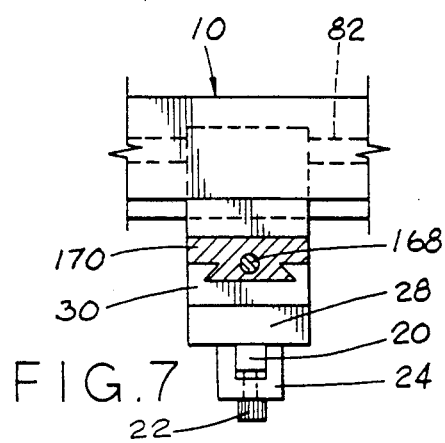
FIG. 7 is a partial sectional, top plan view of the tool holder taken along line 7—7 of FIG. 6.

FIG. 7 is a partial sectional, top plan view of the tool holder taken along line 7—7 of FIG. 6 and shows tool 20 positioned in tool holder 24 which has threaded member 22 positioned therein for engagement with the tool 20. Rotation of member 34 by handle 32 causes movement of screw 168 to cause movement of channel member 170 along member 30.

Figure 8:
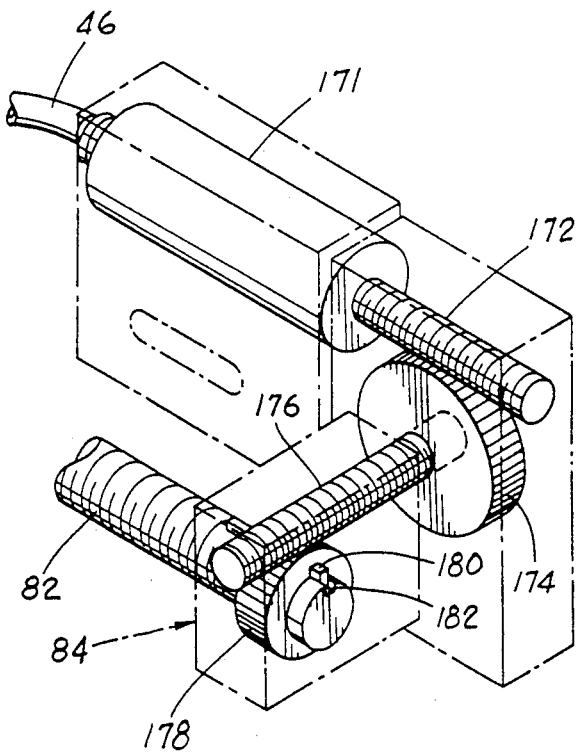
FIG. 8 is an upper, perspective view of the gear feed component of the present invention.

FIG. 8 is an upper, perspective view of the gear feed component of the present invention showing air line 46 from the manifold explained previously to a variable speed air motor 171 which provides rotation of screw 172. Screw 172 in turn provides rotation to gear 174 on one end of screw 176 thereby causing rotation of gear 178 positioned on lead screw 82. Lock member 180 is positioned in key way 182 for fixedly positioning gear 178. Journal housing 84 supports the lead screws and gears as explained previously in connection with FIG. 1 and FIG. 2. The gear feed component shown in FIG. 8 allows positive and reliable rotation of the lead screw 82 and the gear feed component is housed in a single unit.

FIG. 9 is an upper, perspective view of another embodiment of the device of the present invention showing cylindrical member 184 with positioning extentions 186, 188, and 190. These extentions are used for positioning the assembly shown in FIG. 9 on a reactor flange with bolts 192 and 194 along with two other bolts not visible in FIG. 9. Bed 196 is positioned on cylindrical member 184 and adapted for rotational movement so that cutting can be accomplished with cutting tool 198 positioned in holder 200.

Finger adjustment knob 204 provides rotational movement to lead screw 206 to cause longitudinal movement of tool 198 along the longitudal recess of bed 196. Positioned above bed 196 is assembly 208 which provides power through motor 210 to cause rotational movement of bed 196 and cutting with tool 198. Motor 210 is an air motor being supplied with compressed air through line 212.

Assembly 208 includes body 214 having a manifold 216 positioned thereon and a one-piece casting which is retainer bracket 218.

As pointed out previously, the assembly 208 provides rotational movement of bed 196 and the tool 198 thereby allowing machining of a workpiece.

FIG. 10 is a partial sectional, elevational side view of the device shown in FIG. 9 with cylindrical member 184 having a threaded rod 222 extending vertically and being connected with nut 224 to positioning extentions 186, 188, and 190. Bolt 194 with lock nut 228 is positioned on positioning extention 186 and similar bolts and lock nuts are provided on the other three positioning extentions so that the device may be rigedly and fixedly positioned on a workpiece such as reactor flange 230.

Threaded pin 222 extents vertically through cylindrical member 184 and is coupled to retainer bracket 218 with lock nut 232.

Sleeve 234 having key 235 is positioned over cylindrical member 184 and is connected with gear train ring 236 by key 235 to cause rotation of bed 196 so that the air from line 212 to reversable motor 210 provides clockwise or counter-clockwise rotation to the bed 196 through gear 238 positioned between upper thrust member 240 and lower thrust member 242. Thrust nut 237 is positioned on sleeve 234 along with retainer nut 239 to provide variable thrust.

Cutting tool 198 may be positioned at various angles as shown in the broken line representations in holder 200. Holder 200 is positioned on lead screw 206 which has knob 204 positioned thereon. The other end of lead screw 206 has a ratchet 244 with a pin 246 positioned thereon and is a star feed or intermittent feed system. Set screw 248 provides fixed positioning of the pin 246.

Thus in viewing FIG. 10, it will be appreciated that as air provides rotational movement to the assembly 208 having body 214 as a portion thereof that the tool 198 cuts the face 250 of reactor flange 230. Knob 252 on assembly 208 allows assembly 208 to be positioned.

Knob 252 is a tension ajustment or lock to prevent backlash of assembly 208.

Actuation knob 254 on assembly 208 provides for actuation and deactuation of rotation of bed 196.

Thus it will be appreciated in viewing FIGS. 9 and 10 that the embodiment of the present invention shown in these two Figures allows a portable device to be positioned on a flange or other workpiece and provides positive, accurate, close-tolerance machining of such work piece.

Figure 11:
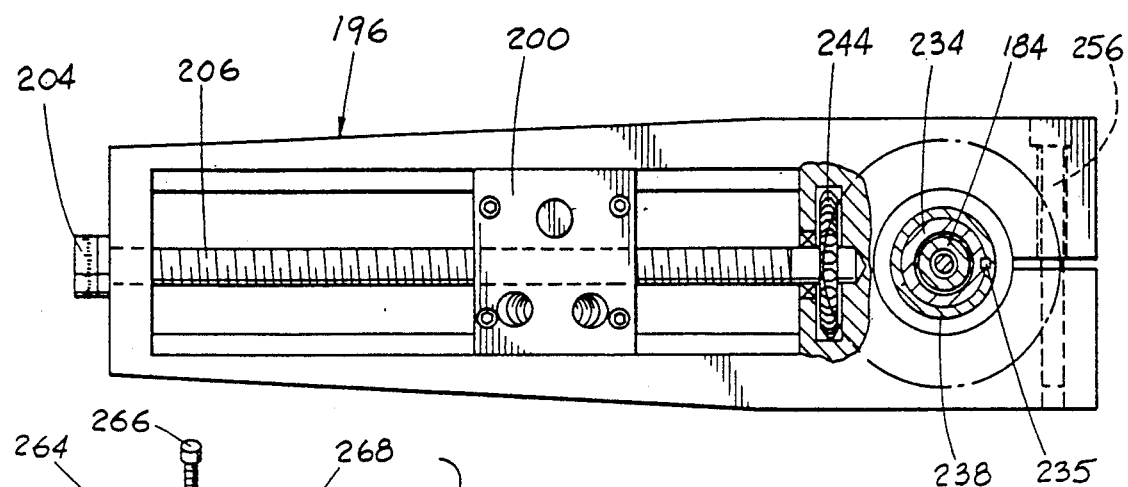
FIG. 11 is a partial sectional, top plan view of the device shown in FIG. 9 taken along line 11—11 of FIG. 10.

FIG. 11 is a partial sectional, top plan view of the device shown in FIG. 9 taken along line 11—11 of FIG. 10 showing bed 196, lead screw 206 having knob 204 for manual adjustment attached to one end and ratchet 244 attached to the other end. Tool holder 200 is shown positioned on bed 196. Cylindrical member 184 is shown having sleeve 234 positioned over such cylindrical member 184. Bolt 256 provides tightening of the bed 196 on the cylindrical member 234.

Figure 12:
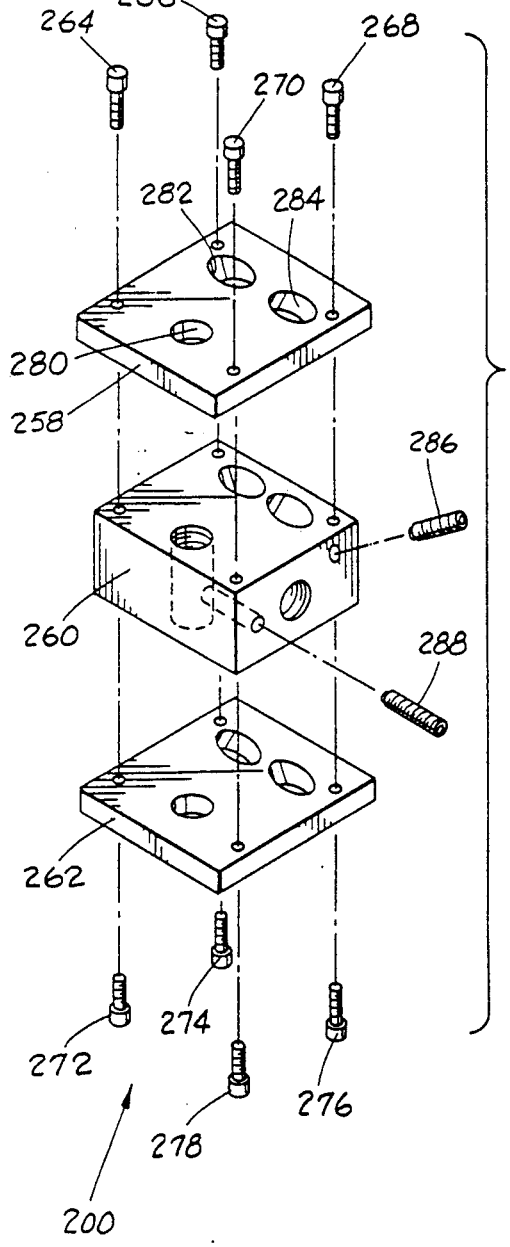
FIG. 12 is an exploded, upper perspective view of the tool holder shown in FIG. 11.

FIG. 12 is an exploded, upper perspective view of the tool holder shown in FIG. 11 showing upper template 258 positioned on central member 260 which is positioned on lower template 262. Upper bolts 264, 266, 268 and 270 are positioned in the holes on upper template 258 and to central member 260. Lower bolts 272, 274, 276 and 278 are positioned in the lower template 262 and to central member 260. It will be appreciated that the cutting tool can be placed in opening 280, 282 or 284 for positioning the cutting tool either in a vertical position or in either in two angular positions shown best in FIG. 10. Set screw 286 and set screw 288 provide fixed positioning of the cutting tool as required and as desired.

FIG. 13 is a partial, sectional, elevational side view of another embodiment of the device of the present invention shown positioned on a workpiece such as a large diameter reactor flange 290 having a face 292 on which a cutting tool 294 is positioned. The workpiece 290 may be a large diameter reactor flange of 36 inches, for example, or greater diameter.

Assembly 296 includes body 298 having a counterweight 300 positioned to balance the bed 302 having lead screw 304 and tool positioning member 306 which has a knob 308 and a handle 310 for vertical positioning of tool 294. The positioning of assembly 296 is accomplished by tightening bolts 310, 312 and 314 against the inside of the flange as explained previously in connection with other embodiments of the present invention. Plate 316 has positioned thereon housing 318 having gear 320 fixed to plate 316 with a plurality of set screws such as set screw 322 and set screw 324. Gear 320 is driven by gear 326 on shaft 328 which is rotated in a manner described previously from air motor 330 which has air line 332 coupled to the air motor 330 for actuation. Upper thrust bearing 334 and lower thrust bearing 336 are positioned over shaft 338.

Because the device shown in FIG. 13 is adapted for large workpieces such as large diameter reactor flanges, a support assembly is required for the end of the device and includes bolt 340 positioned on ell ring member 342 on which is positioned support 344. Ring member extends around the outer portion of the flange for supporting bed 302. Bolt 340 passes through flange hole 346, through washer 348, and is ridgedly held in place with nut 350.

Manifold 352 is similar to the manifolds described previously in connection with other embodiments of the present invention and no further explanation is thought to be required.

FIG. 14 is a partial sectional, elevational side view of the counterweight component shown in FIG. 13 with counterweight 300 being adapted for an extention member 354 connected with bolt 356 to nut 358 welded with weld 360 to plate 362. Extention 354 has bolt 364 on which may be positioned weight 366 and held in place with nut 368. It will be appreciated that additional weights similar to weight 366 may be positioned adjacent to weight 366 on bolt 364 so that a balance may be achieved with the counterweight system thereby allowing floating rotation of the tool on the workpiece and providing a uniform and close-tolerance machining operation.

Figure 15:
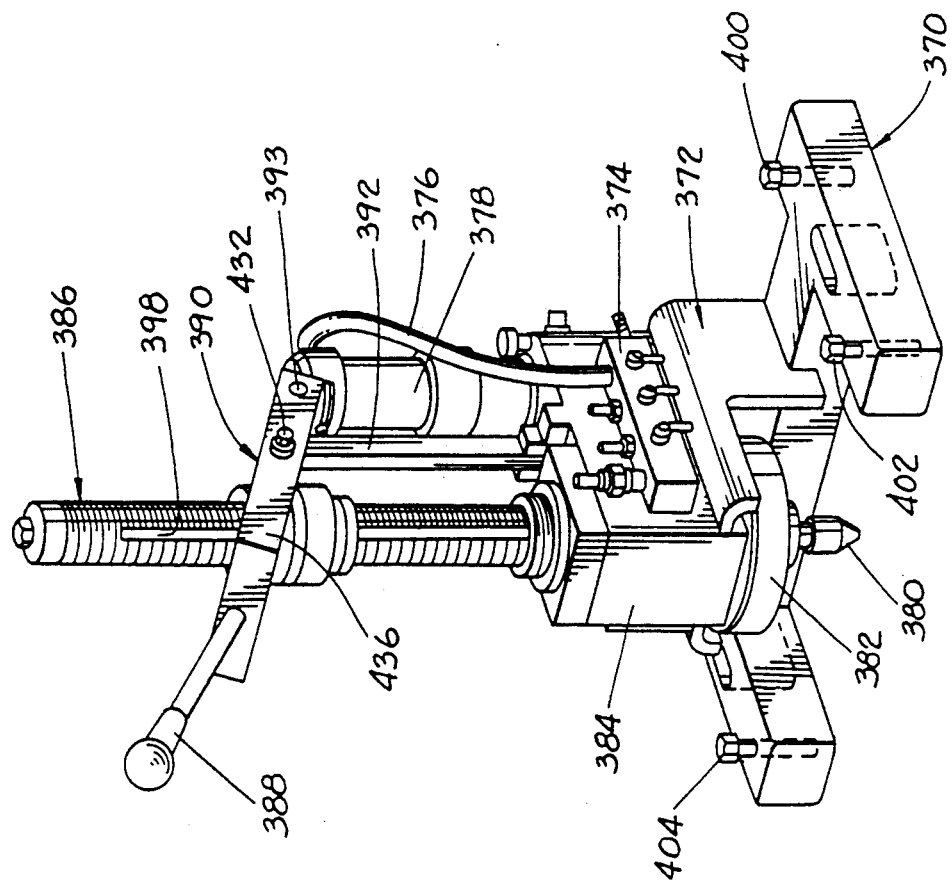
FIG. 15 is an upper, perspective view of another embodiment of the present invention showing a rotating cutter.

FIG. 15 is an upper, perspective view of another embodiment of the present invention showing a rotationing cutter having frame 370 on which is positioned assembly 372. A manifold 374 has line 376 connected to air motor 378 which drives the chuck 380 which is positioned on plate 382 Plate 382 is positioned on housing 384 through which threaded shaft 386 extends. Threaded shaft 386 has positioned thereon manual control means which includes handle 388 connected to bracket 390 which controls vertical movement of the threaded shaft 386. Vertical bar 392 is connected to pivot rod 393 which supports bracket 390. Threaded shaft 386 has washer nut 432 connected to bracket 390 to allow vertical movement of threaded shaft 386 which has a longitudinal slot 398.

Bolts such as bolts 400, 402, and 404 are positioned on frame 370 and allow frame 370 to be positioned selectively at a location on a workpiece so that as rotation of chuck 380 occurs, a drill or milling tool may be positioned in chuck 380 for removal of material on the workpiece so that such workpiece is polished, finished, or has material removed for whatever purpose may be required or desired.

Figure 16:
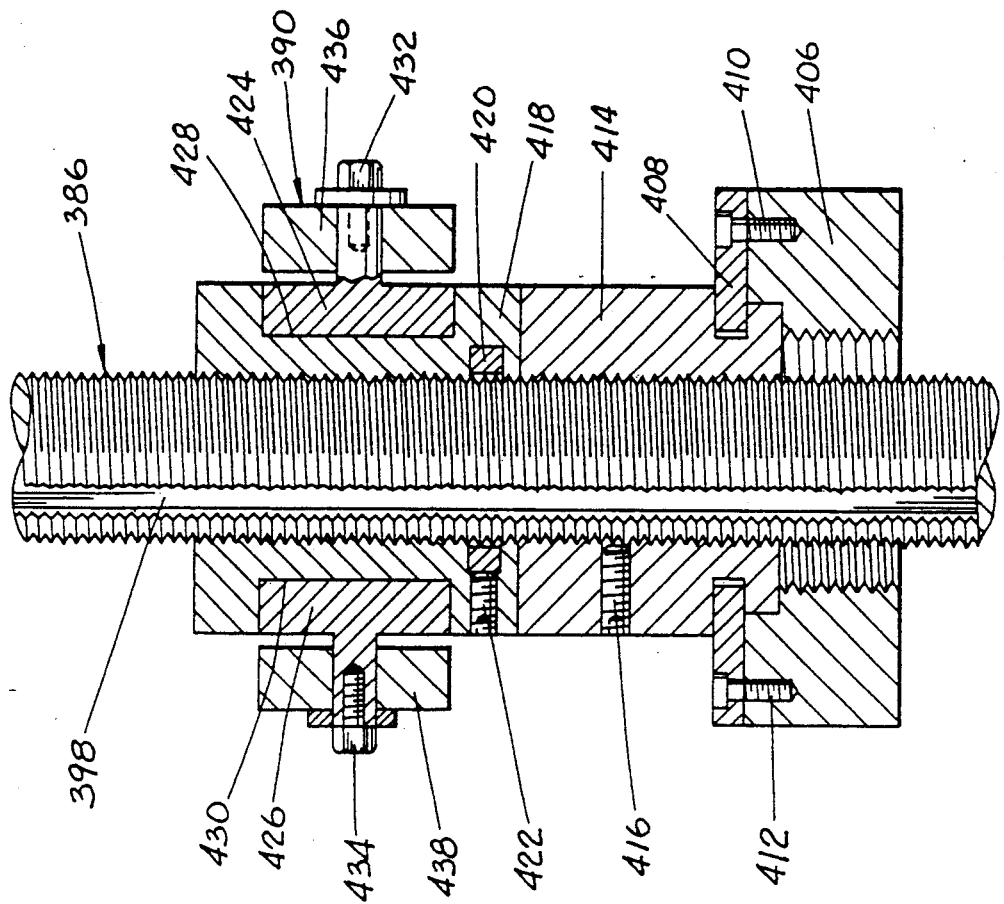
FIG. 16 is a partial sectional, elevational side view of the feed mechanism of the device shown in FIG. 15.

FIG. 16 is a partial sectional, elevational side view of the feed mechanism of the device shown in FIG. 15 with threaded shaft 386 having slot 398 therein positioned on plate 406. Plate 406 has an annular member 408 positioned thereon and attached with screws such as screw 410 and screw 412. Member 414 has a set screw 416 for fixedly positioning threaded shaft 386.

Member 418 is positioned adjacent member 414 and has lock washer 420 which may be tightened with set screw 422 to ridgedly position threaded shaft 386. Members 424 and 426 are positioned in the recesses 428 and 430 of member 418 to allow washer nuts 432 and 434 to connect arm 436 and arm 438 of bracket 390, to member 418 and allow vertical movement of threaded shaft 386.

Thus, it will be appreciated that the present invention provides a portable tool having many applications and uses with a minimum amount of set-up time required at the work site.

The various embodiments of the tool of the present invention allow reactor flanges, for example, to be machined without expensive and time-consuming removal of such reactor flanges.

Although preferred embodiments of the invention have been shown and described in accordance with the requirements of the United States Patent Laws, it will be appreciated by those skilled in the art to which the present invention pertains that many modifications and improvements may be made without departing from the spirit of the invention as defined in the claims.

I claim:

1. A portable machine tool for machining a workpiece to a tolerance of 0.0005 inch at its usual location of use, said portable machine tool weighing less than fifteen pounds and including in combination
   bed means having a longitudinal axis and a counterweight on one end, said counterweight having controlled moment and balance,
   tool station means positioned on said bed means and adapted for non-continuous movement both vertically and horizontally with respect to said longitudinal axis, and
   positioning means mounted on said bed means and adapted for substantially rigid connection to said workpiece, said positioning means including a base plate having a plurality of adjustment screws for alignment of said bed means on said workpiece, a cylindrical member positioned below said base plate and having a plurality of positioning bolts for engagement within said workpiece, and drive means including a manifold, gear means including a three speed transmission for selective torque and speed transmission, a drive shaft coupled to said gear means, and braking means coupled to said drive shaft to control rotational speed of said drive shaft.

2. A portable machine tool weighing less than fifteen pounds for machining a reactor flange at its usual location of use and having an inside diameter greater than thirty inches, said portable machine tool including in combination
   assembly means including a body member, a manifold, an air motor, an actuation knob, and a retainer bracket, said manifold, air motor, actuation knob and retainer bracket being positioned on said body member,
   a cylindrical member coupled to said assembly means and having a plurality of positioning extensions each having a bolt for engagement with the inside of said reactor flange, and
   longitudinal bed means including a lead screw, a finger adjustment knob coupled to said lead screw, a cutting tool, and a star feed coupled to said assembly means whereby said longitudinal bed means is rotated in response to actuation of said actuation knob and said cutting tool moves radially inwardly to remove material from said reactor flange.

3. A portable machine tool for machining a reactor flange at its usual location of use and having an inside diameter greater than thirty inches, said portable machine tool including in combination
   assembly means including a body, a manifold coupled to said body, and a one-piece retainer bracket coupled to said body,
   a cylindrical member connected to said retainer bracket and extending through said assembly means,
   a plurality of extension members each having a bolt and a lock nut and positioned at the lower end of said cylindrical member,
   a threaded rod inside said cylindrical member, said rod being connected at its upper end to said retainer bracket and connected at its lower end to said plurality of extension numbers,
   a sleeve positioned over said cylindrical member,
   a retainer nut positioned at the upper end of said sleeve, a thrust nut positioned above said retainer nut on said sleeve, gear means including an upper thrust member, a lower thrust member, a gear, and a gear train ring positioned over said sleeve, a key positioned between said gear train ring and said gear, longitudinal bed means positioned below said gear train ring and including a cutting tool, an adjustment knob, and a star feed, a reversible air motor positioned on said assembly means to drive said gear to provide rotational movement of said longitudinal bed means in a clockwise or counter-clockwise direction, and actuation means connected to said reversible air motor to continuously control a supply of compressed air to said reversible air motor.

4. A portable machine tool defined by claim 3 and further including a source of compressed air connected to said actuation means.

* * * * *